United States Patent [19]
Zetts et al.

[11] Patent Number: 5,802,388
[45] Date of Patent: Sep. 1, 1998

[54] SYSTEM AND METHOD FOR CORRECTION AND CONFIRMATION DIALOG FOR HAND PRINTED CHARACTER INPUT TO A DATA PROCESSING SYSTEM

[75] Inventors: John Mark Zetts, Falls Church, Va.; Mario Jose Galliano, Boynton Beach, Fla.; Alan R. Tannenbaum, Lighthouse Point, Fla.; William J. Tracey, Boyton Beach, Fla.; Keun J. Lee, Boca Raton, Fla.; Moe R. Desrosiers, Viera, Fla.

[73] Assignee: IBM Corporation, Armonk, N.Y.

[21] Appl. No.: 767,137

[22] Filed: Dec. 19, 1996

Related U.S. Application Data

[63] Continuation of Ser. No. 434,239, May 4, 1995, abandoned.
[51] Int. Cl.⁶ .................................................. G06F 3/00
[52] U.S. Cl. ................................. 395/804; 395/347
[58] Field of Search ................... 395/792, 793, 395/795, 796, 803, 804, 347, 358; 345/156, 173, 179; 364/709.11; 382/119

[56] References Cited

U.S. PATENT DOCUMENTS

| | | | |
|---|---|---|---|
| 5,065,309 | 11/1991 | Putnam et al. | 379/96 |
| 5,148,155 | 9/1992 | Martine et al. | 345/173 |
| 5,157,384 | 10/1992 | Greanias et al. | 345/156 |
| 5,267,327 | 11/1993 | Hirayama | 383/161 |
| 5,347,296 | 9/1994 | Agulnick et al. | 345/156 |
| 5,347,477 | 9/1994 | Lee | 364/709.11 |
| 5,365,598 | 11/1994 | Sklarew | 382/189 |
| 5,404,458 | 4/1995 | Zetts | 395/893 |
| 5,428,805 | 6/1995 | Morgan | 395/800 |
| 5,455,901 | 10/1995 | Friend et al. | 395/149 |
| 5,533,141 | 7/1996 | Futatsugi et al. | 382/119 |

*Primary Examiner*—Heather R. Herndon
*Assistant Examiner*—Stephen Hong
*Attorney, Agent, or Firm*—Morgan & Finnegan LLP

[57] ABSTRACT

A data processing system corrects handprinted character input represented as a sequence of points described by a writing path of a pointing device. The system receives a writing path signal from a pointing device in the data processing system, describing a first hand printed character input. The system performs character recognition on the writing path signal to provide a first character string. The system then displays the first character string in an edit pad area. The system then receives a correcting writing path signal in the edit pad area from the pointing device, describing a correction to the first hand printed character input. The system then performs character recognition on the correcting writing path signal to provide a second character string.

7 Claims, 17 Drawing Sheets

SYSTEM AND METHOD FOR CORRECTION AND CONFIRMATION DIALOG FOR HAND PRINTED CHARACTER INPUT TO A DATA PROCESSING SYSTEM

This is a continuation of application Ser. No. 08/434,239, filed on May 4, 1995 now abandoned.

FIELD OF THE INVENTION

The invention disclosed broadly relates to data processing systems and more particularly relates to hand-written character input systems and apparatus.

BACKGROUND OF THE INVENTION

Related Patents:

The invention disclosed herein is related to the invention described in U.S. Pat. No. 5,252,951 by Yu L. An, et al., "Graphical User Interface with Gesture Recognition in a Multi-Application Environment", assigned to the IBM Corporation and incorporated herein by reference.

U.S. Pat. No. 5,272,470 by John M. Zetts, "Apparatus and Method for Reducing System Overhead While Inking Strokes in a Finger or Stylus-Based Input Device of a Data Processing System", assigned to the IBM Corporation and incorporated herein by reference.

This disclosure seeks to improve the user interface of computers that accept and recognize hand printed characters that are input by means of a stylus and digitizing tablet.

Most of the dominant computer operating systems currently have extensions that facilitate user input via a stylus. These operating systems provide recognition engines that recognize handwritten input and convert it characters. They also provide function rich programming interfaces that provide applications considerable control in soliciting and filtering handwritten or pen input. Despite the proliferation of pen-based operating systems, the number of pen-aware applications at this time are few in number. This is due to the reluctance of the software industry, in general, to accept new technology until standards are defined and invest money before significant marketplace demand materializes.

The result of this time lag is that the operating system must provide a means to enable pen input into existing applications that are unaware of such function. This is accomplished by emulating the two user interfaces that all GUI-oriented applications are written to, namely, keyboard and mouse input. Pen For OS/2, for example, permits a user to print characters over a window of a word processing application. At completion of input, the characters are recognized, converted to ASCII text and delivered to the application. The characters appear to the application to be keyboard generated.

This seemingly unencumbered method of inputting data into an unaware, existing application is flawed due to the inability to correct mistakes in character recognition. Once the recognized text has been sent to most unaware applications, there is no way to retrieve the text and the user must revert to the keyboard in order to correct any errors. This lack of a correction dialog severely limits the usefulness of pen input on unaware applications. The problem is especially acute on operating systems with poor character recognition and with untrained users that have not yet conditioned their handwriting to achieve a higher recognition accuracy rate.

OBJECTS OF THE INVENTION

It is therefore an object of the invention to display an edit pad on behalf of pen-unaware applications for the purpose of providing the user with a correction dialog.

It is another object of the invention to allow the user to enable or disable the automatic activation of an edit pad.

It is still a further object of the invention to allow a user to have multiple active edit pads displayed at one time, one edit pad per application window.

It is yet a further object of the invention to allow the user to have a pop-up edit pad for the purpose of editing text contained in a clipboard memory area, before pasting the data from the clipboard into an application.

It is still a further object of the invention to allow a user to recall previously entered or corrected text for further correction or amendment, in an improved manner.

SUMMARY OF THE INVENTION

These and other objects, features and advantages are accomplished by the invention disclosed herein.

The solution involves the routing of the recognized text, at the user's discretion, to a confirmation dialog window that facilitates the viewing and correction of recognition errors and permits further character input or even cancellation of the text entry. The dialog window employs a type of window known as a "combed box" which offers a higher recognition accuracy and a simpler input scheme. In addition, the combed box supports the use of hand written gestures that accelerates the deletion of characters or insertion of blank spaces. When the text has been corrected and/or confirmed, the user presses an OK button to dismiss the dialog window and send the text to the application.

Another option available to the user is to configure the confirmation dialog to simply timeout after a specified period of time has elapsed. Upon timing out, the text is released into the target window. If, before the timeout occurs, the user moves the stylus over the confirmation box, the timer is cancelled in anticipation that user input is imminent. The rationale for the automatic timeout feature is that it allows the user to confirm the text without requiring any further interaction unless editing is desired.

Once the confirmation dialog is displayed, it is dedicated to the application to which handwritten text was entered. Without dismissing the confirmation dialog, the user is free to write elsewhere into windows belonging to other applications. As recognition occurs, the results are routed to yet another confirmation dialog, one that is assigned to that particular application. The system maintains a one-to-one correlation between applications and confirmation dialogs.

Due to the multi-tasking nature of the OS/2 operating system, it is quite likely a user will continue to write into a window while previously written text is being recognized or is in the process of being routed to a confirmation dialog. Should the user continue to write on a window that has an existing confirmation dialog, the additional text is routed to the dialog window where it is appended to the previously recognized text. If the appended text is the second half of a partially recognized word, the characters will be appended without a leading space. Otherwise, a space is inserted to delineate the old and new text. The juxtaposition of the newly entered ink and the previous ink is examined to determine if the user desired spacing. To help orient the user, instead of erasing the old ink as the characters are recognized, the ink may be changed, at user or system discretion, from a solid, dark color to much lighter or shadow ink. After the most recent set of strokes have been recognized, if the user leaves a detectable proximity zone or moves the pen outside the window, it will be assumed that input is complete. The shadow ink will be removed and any further input will have a leading space inserted in front of the text.

Another method of routing character input into an application is via the system clipboard which has become ubiquitous in GUI operating systems. A user may also confirm text retrieved from the clipboard. By means of a gestural command on the application window, the confirmation dialog is activated and the text contained in the clipboard is displayed for editing before releasing (pasting) it into the application.

To further ease the correction and reworking of previously entered text, the operating system retains in memory the last 1000 characters that have been processed by the confirmation dialog. The user may recall any or all of the previous sets of recognized characters by means of a spin button containing an up and down arrow. These arrows control the retrieval of previously confirmed text on a character-by-character basis giving the user precise control over how much text is retrieved. As the text is retrieved, it is inserted into the confirmation box in front of any existing text.

Yet another use for the spin button in the confirmation dialog is for retrieving command line information when the confirmation dialog is associated with an OS/2 command window. Pressing the up and down arrow would be functionally equivalent to the up and down arrows on the keyboard, a common method for retrieving command history.

Also disclosed is a method of editing pre-existing text in an application that has not been pre-processed by the confirmation dialog. The technique involves highlighting the text using the pen and, by means of an edit gesture (e.g., circling the text), copying the highlighted data to the clipboard and activating the confirmation dialog. The confirmation dialog, aware that it was started via an edit gesture, accesses the clipboard and copies the text into the confirmation dialog window for editing. After the editing is complete, text is sent to the target application, replacing the text that was highlighted.

DESCRIPTION OF THE FIGURES

These and other objects, features and advantages will be more fully appreciated with reference to the accompanying figures.

DISCUSSION OF THE PREFERRED EMBODIMENT

Reference can be made to the above-cited Yu L. An, et al. and John M. Zetts patents which are incorporated herein by reference, for a description of the OS/2 presentation manager (PM) and window procedures. These two cited patents provide background information on the graphical user interface used in the OS/2 environment, to provide for gesture recognition for multiple applications. Useful background information is provided in these patents on the processes of inking strokes in a finger or stylus-based pen input subsystem for a data processing system.

To extend pen functionality to pen-unaware applications, Pen for OS/2 implements a compatibility module that collects handwritten strokes, performs handwriting recognition, and routes the resultant text to the unaware application. When the user first begins to write, the system detects that the application is pen-unaware and the compatibility module is given control to perform the necessary pen function.

Figure 1:
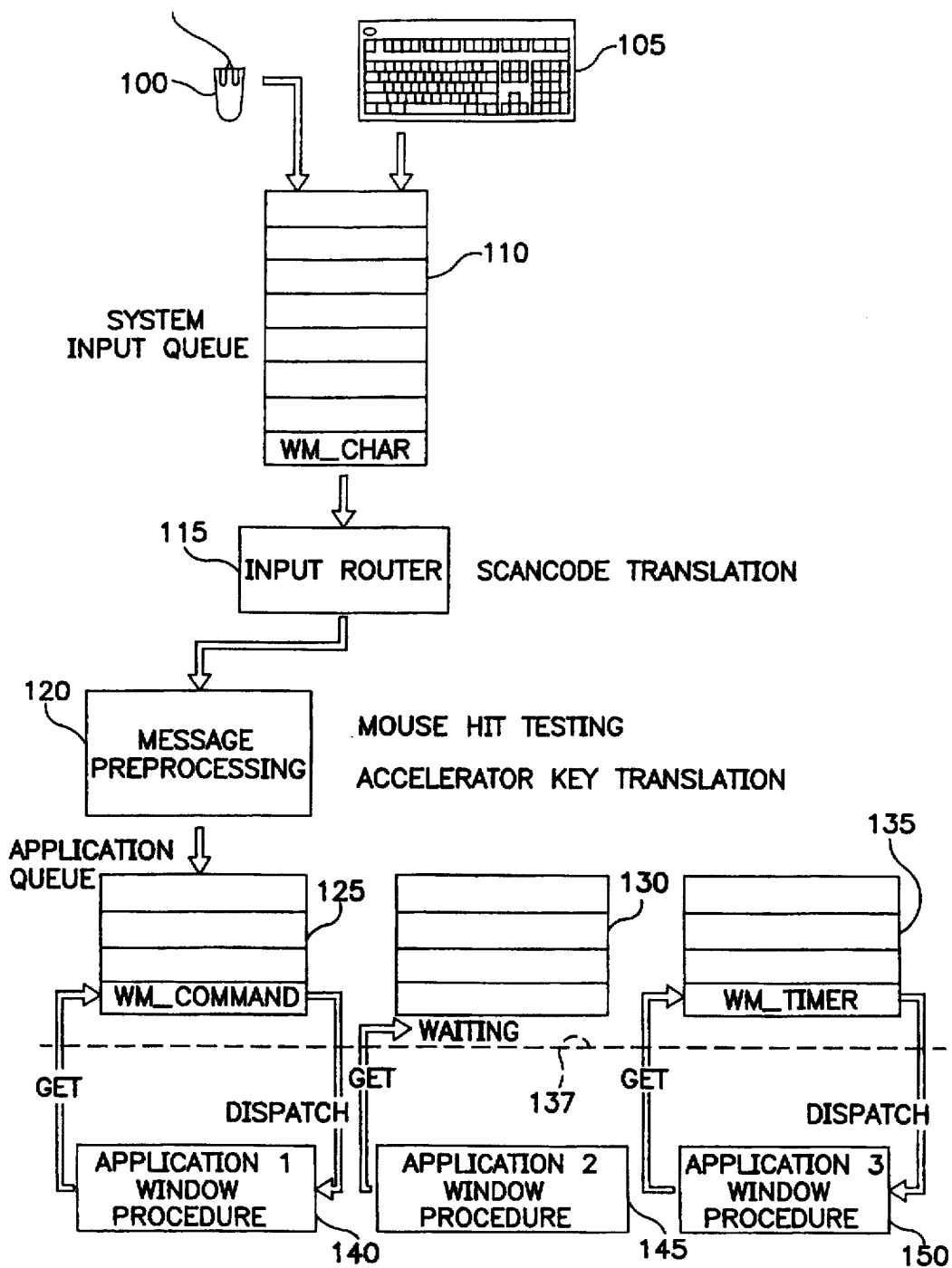
FIG. 1 is an architectural diagram of OS/2 presentation manager and window procedures.

FIG. 1 depicts is an architectural diagram of the OS/2 presentation manager and window procedures of three applications. Starting at the top a mouse device 100 and keyboard device 105 provide inputs into a system input queue 110. The single system queue 110 enqueues all inputs maintaining the chronological order of the mouse and keyboard events as the user performs them. The presentation manager input router 115 dequeues each of these events serially and sends them to a message pre-processor 120 which does some preprocessing of the mouse and keyboard events. After preprocessing they are then rerouted to the appropriate application queue 125, 130 or 135 depending on the destination application of the message. Asynchronously, application 1 window procedure 140, or application 2 window procedure 145, or application 3 window procedure 150 will ask for the next message at which time the message is routed to the particular window procedure. The application queues 125, 130 and 135 may be full of many types of PM messages; the mouse and keyboard inputs are just two of many types. The mouse and keyboard input are put into the application queue as the user performs the actions and they are routed when the time comes to the application.

To dequeue the next message the application 1 window procedure 140 issues a "get message" to PM. The presentation manager dequeues a message and then application 1 issues a dispatch, routing the message to the correct window procedure. FIG. 1 shows application 1 having a single window procedure 140, however, the application may have more than one window procedure in which case the dispatch will send it to the appropriate window procedure. The dotted line 137 depicts the line of demarcation between the presentation manager operating system and application code.

Figure 2:
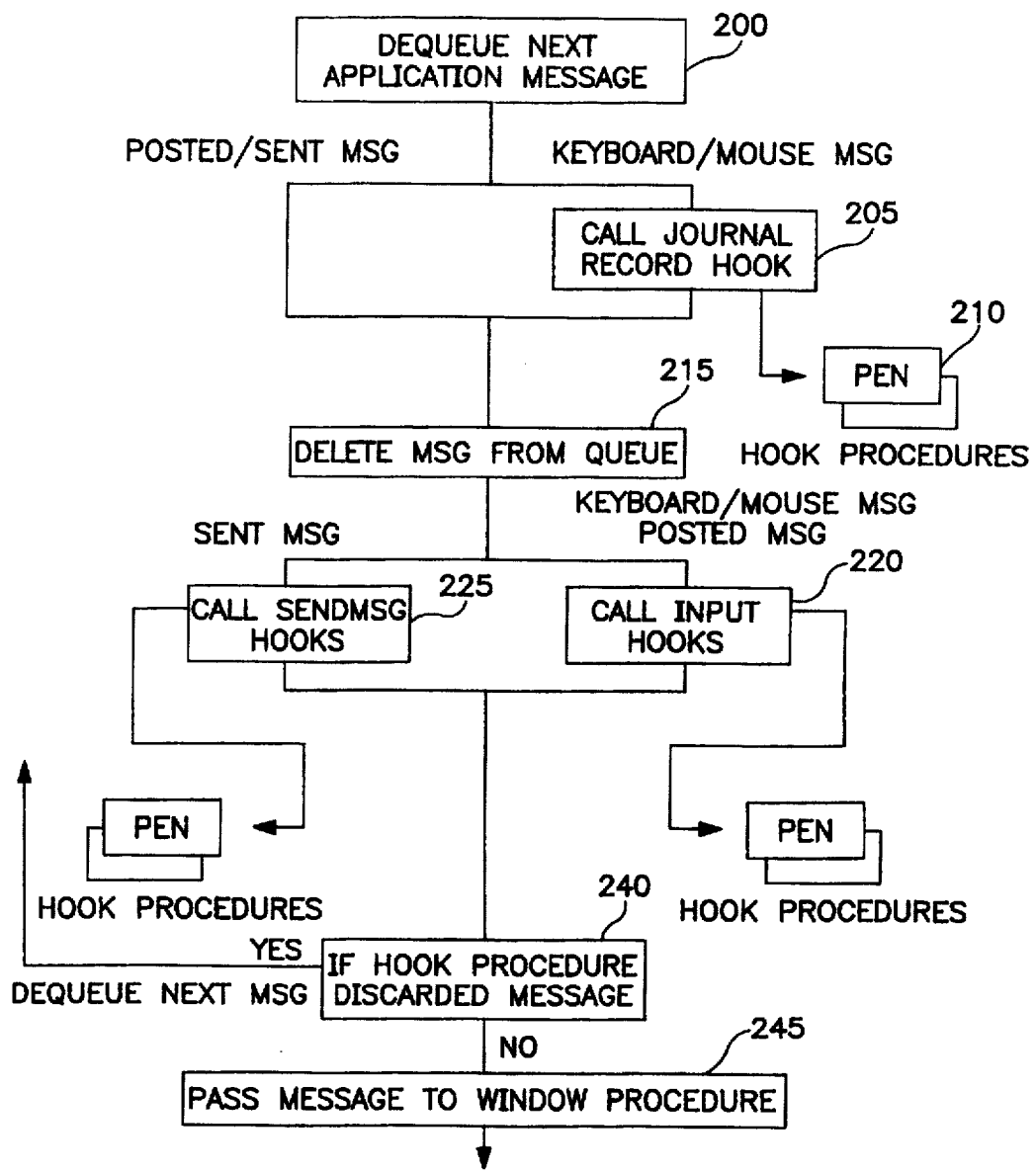
FIG. 2 is an architectural diagram of OS/2 presentation manager and its various hooks.

FIG. 2 is a diagram of the presentation manager router logic. The purpose of this logic is simply to pull off the next message from the application queue and route it to the appropriate window procedure. PM has always had a feature that would allow applications to see these messages as they are being processed so that the application could optionally take some action on the message. These are called hooks. The presentation manager has several hooks of which three are depicted in FIG. 2. Starting at the top the PM dequeues the next application message 200 at which time it is divided. PM tests to see whether it is a posted message from an application or a user input message which would mean keyboard or mouse input. If it is a keyboard or mouse message PM calls the journal record hook 205. The journal record hook 205 provides the application or the hook procedure 210 with a copy of the message so the hook procedure will know what message is currently being processed. After the hook procedure 210 sees the message it returns back to PM 205 and processing continues. The next step is PM goes back to queue and deletes the message from the queue 215 and then it performs a test to see whether the message queued was a sent message or whether it was a keyboard or mouse message. If it was a keyboard or mouse message, it is considered user input so PM calls the input hook 220. If there are multiple hook procedures, they are called in serial fashion. The first one in the diagram being pen 230. After pen 230 sees the message it returns back to PM 220 and PM continues to route the message. When the pen hook procedure returns back to the input hook caller it may specify to, for example, discard the message. At 240 the presentation manager performs a test to see whether the hook procedure wanted the message discarded. If it does not, the message can pass on to the window procedure. If the hook procedure 230 did want to discard the message, PM discards the message and then goes back to the top of the loop at 200 to dequeue the next message. Returning to step 215, after the message is deleted from the queue, if the message was a sent message, PM calls the send message hook at 225. Again, there might be many hook procedures registered, PM calls each one in serial fashion, the first one being pen at 235. At step 240 for a sent message, the message gets passed on to the window procedure. Step 245 is where PM prepares the message to be routed to the window procedure.

Figure 3:
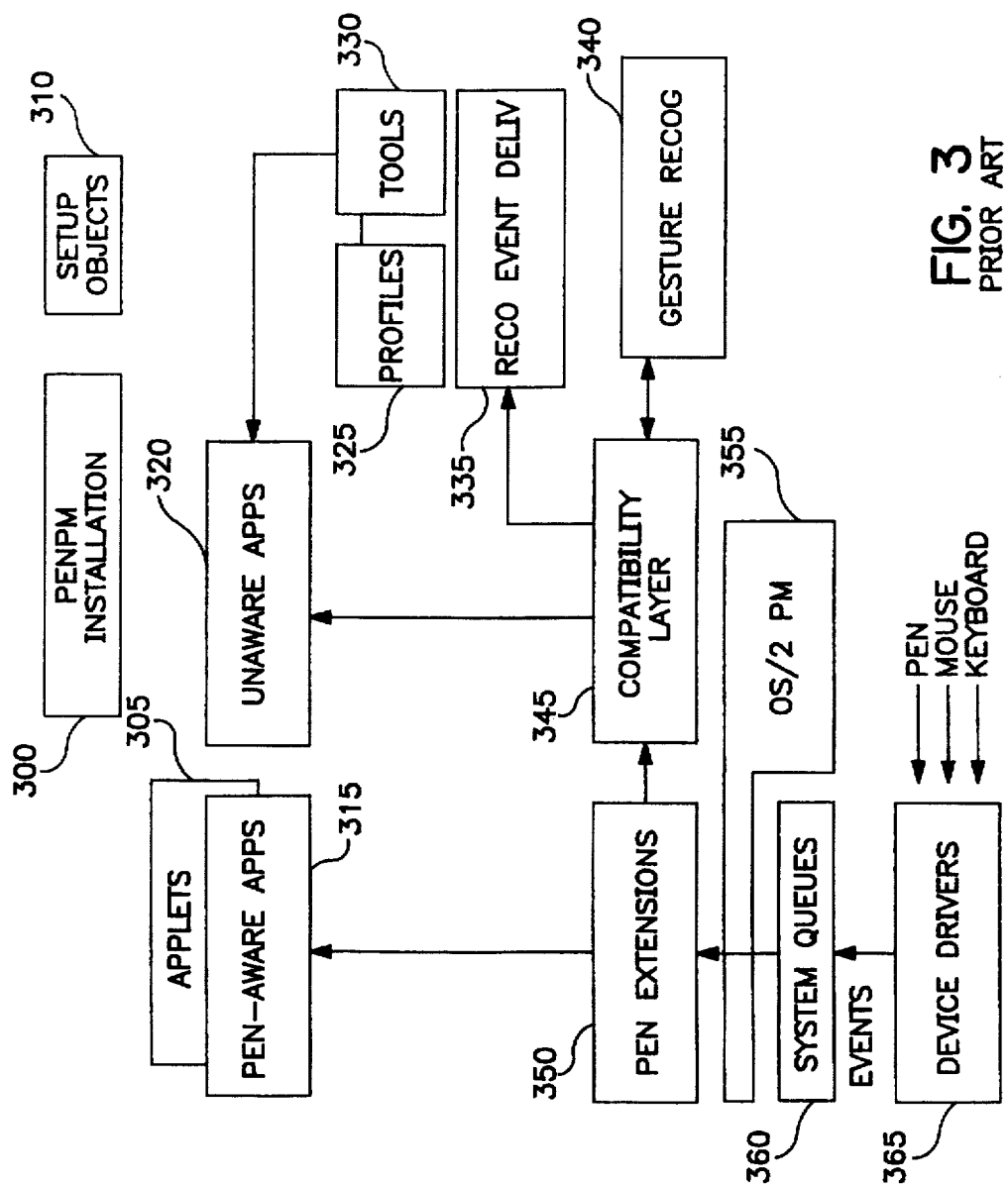
FIG. 3 is an architectural diagram of pen for OS/2 and the compatibility window.

FIG. 3 is a high level diagram of system components for Pen For OS/2. Starting at the bottom it shows that the input devices pen, mouse and keyboard all are connected to device drivers 365 which, upon receiving events, route these events into the system queues 360. The system queue 360 is subsequently processed by OS/2 presentation manager 355 which then routes all these events to the pen extensions 350. The pen extensions 350 process the pen and mouse events accordingly. In the case of applications that are pen unaware the compatibility module 345 is used. The compatibility module 345 acts as an aware application on behalf of the unaware applications. Depending on what is actually taking place, let's say the user is inputting strokes, the compatibility module 345 will route all the strokes to a gesture recognition engine 340. When the gesture recognition engine 340 comes back with a recognized gesture it sends the results back to the compatibility module 345 which in turn sends the recognition event to a layer called recognition event delivery (RED) system 335. Depending upon what action the gesture might result in, profiles 325 are accessed and optionally tools 330 can perform other action on the unaware application 320.

Further information on these operations can be found in U.S. Pat. No. 5,252,951 by Alan Tannenbaum, John M. Zetts, et al. entitled "Graphical User Interface With Gesture Recognition In a Multi-Application Environment", assigned to the IBM Corporation and incorporated herein by reference.

In the case of pen aware applications 315, these applications will handle all pen messages and pen events generated by the pen extension layer 350 and these pen aware applications really have no need for the compatibility module 345. Small application programs, or Applets 305 are short applications that are included with the Pen For OS/2 product, that help users with productivity aids such as a pop-up hand writing window, or a pop-up sketch pad that allows the user to doodle or write into a bit map. Pen PM installation 300 is a program the user invokes to install the Pen For OS/2 product on the computer and the setup objects 310 are an adjunct to the pen PM installation 300. They are also used for installing key components of Pen For OS/2.

Figure 4:
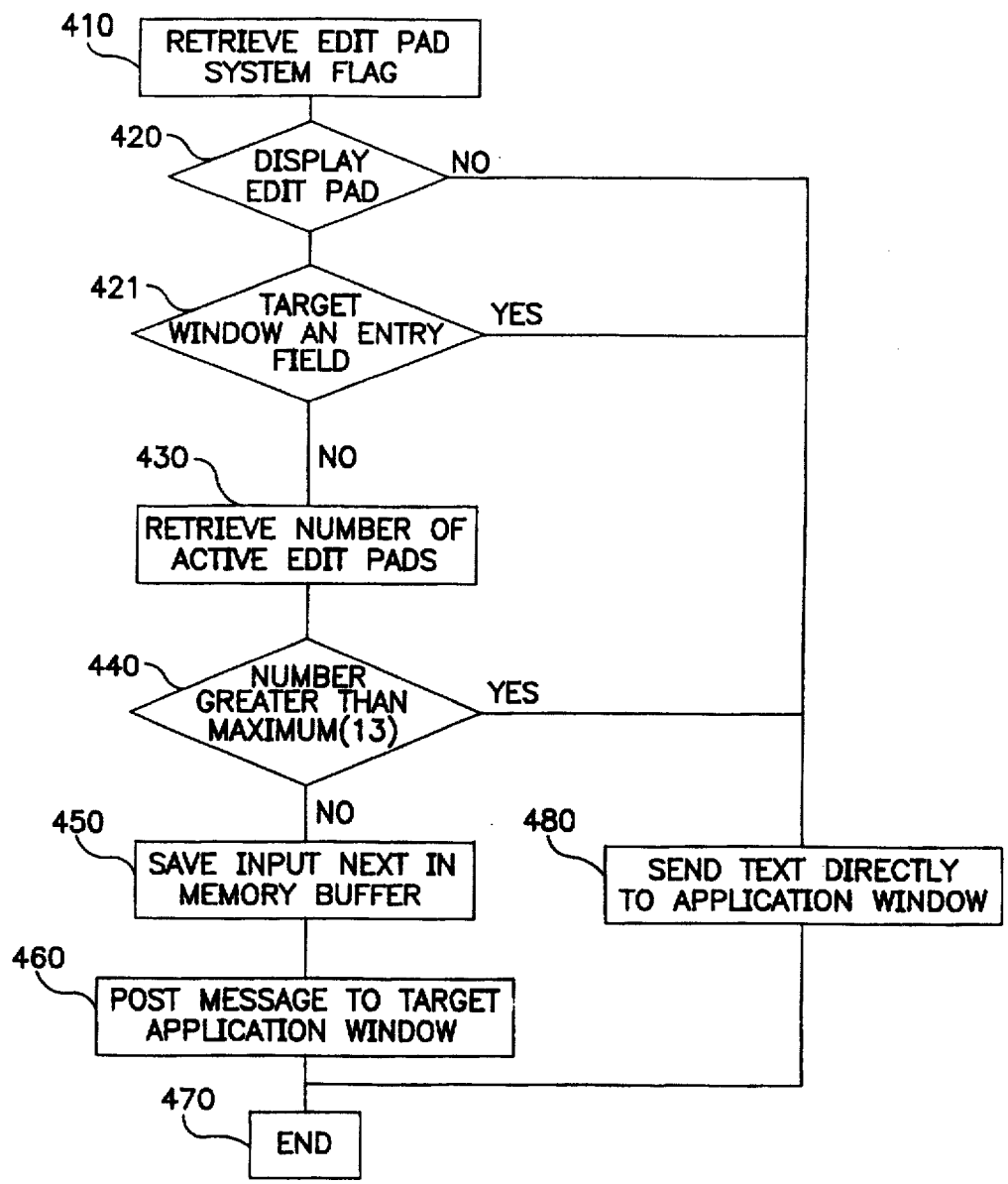
FIG. 4 is a flow diagram of the processing by the compatibility window of text received from the handwriting recognition engine.

FIG. 4 depicts the code execution when the compatibility module receives text from the handwriting recognition window. A check is first made to see if the user desires an edit pad by retrieving the system preference flags that enables the display of the edit pad 410 and testing the current state of the flag 420. If the user enabled the edit pad, then another check is made to determine the type of window underneath the handwriting. Certain entry fields have their own method of correction that is superior to the edit pad so the edit pad is not displayed for these types of fields.

If the target window is not an entry field 421, the number of active edit pads is retrieved 430 and check 440 determines if it exceeds the maximum number of active edit pads. The maximum number of active edit pads is set by the system on the rationale that there is a limit to the number of active windows that can be displayed at one time with enough of the window visible to enable work and interaction with the user.

If the number of active edit pads is greater than maximum 440, the text is routed directly to the target window 480 and no edit pad is displayed. Otherwise, the input text is saved in a memory buffer 450 and the target application is posted a "display edit pad" message 460. The purpose of the message is to force a context switch from the context of the compatibility window to the context of the target application. Since the intent is to display the edit pad as if the application had done so itself, the edit pad must be created and activated under the context of the target application. Therefore, the creation of the edit pad window is deferred until such time as the operating system switches the context of the computer to that of the target window for the purpose of handling the posted "display edit pad" message. The flow diagram ends at 470.

Figure 5:
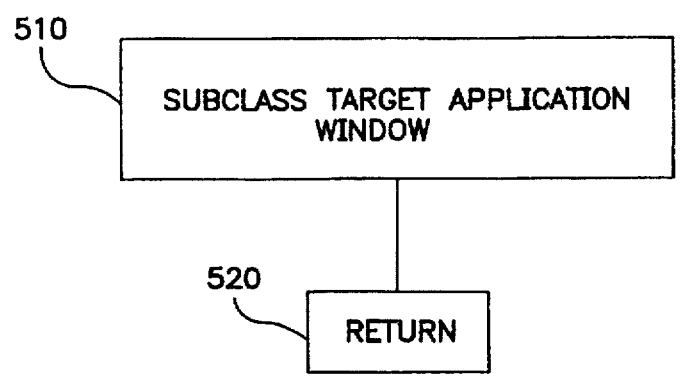
FIG. 5 is a flow diagram of the processing by the OS/2 hook procedure of the "display edit pad" message.

FIG. 5 contains the logic of the pen for OS/2 hook procedure. The pen subsystem sets an OS/2 presentation manager hook that is given control immediately prior to passing messages to the various application window procedures. The hook permits the pen subsystem to see all window messages before the application sees them and allows pen to discard messages to prevent them from being routed to the application.

Figure 7:
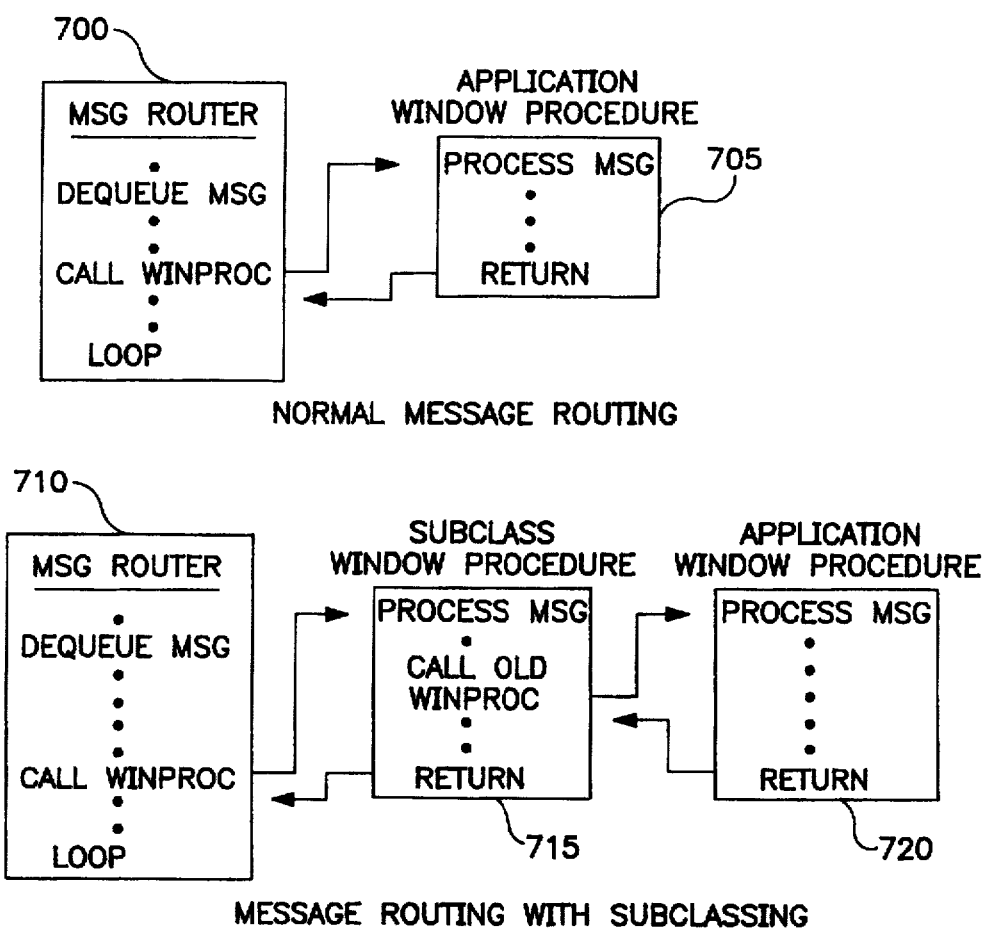
FIG. 7 depicts a sub-classing of a window procedure.

In FIG. 5, when the pen hook sees the "display edit pad" message in the hook procedure, it is executing in the context of the target application. The hook procedure subclasses the target window procedure 510 and returns 520. FIG. 7 depicts a subclassing of a window procedure. Subclassing is a standard technique in windowing operating systems to intercept messages before they are seen by the window procedure that controls a particular window. The operating system requires however that the subclassing be performed in the context of the application window being subclassed. Posting a "display edit pad" message and intercepting it in the OS/2 hook allows the pen subsystem to set the subclass in the proper context.

Figure 6:
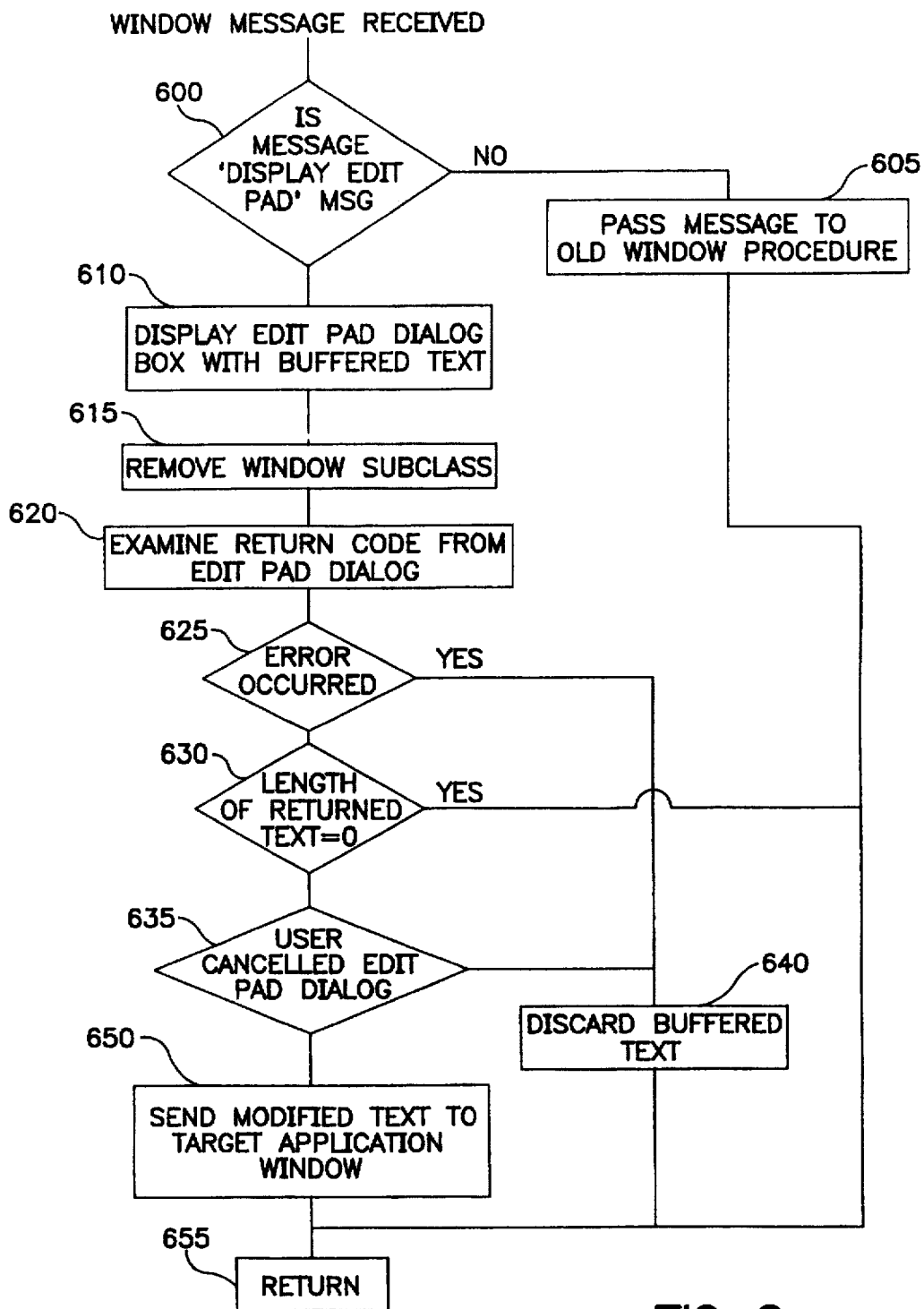
FIG. 6 is a flow diagram of the window procedure that subclasses the target application window.

FIG. 6 is the logic flow of the subclass window procedure. Note that all messages sent to the target application window are first sent to this subclass window procedure. The message of interest is the "display edit pad" message 600 and any other message is allowed to pass on to the target application window 605. When the "display edit pad" message is seen at 600, the edit pad dialog box window is created at 610, displaying the text received from the handwriting recognition engine.

The invocation of the edit pad dialog box is application modal and processing in the subclass window procedure is halted until the edit pad dialog processing completes and returns. The edit pad dialog facilitates the correction and alteration of the displayed text, by means of handwriting, the keyboard, or gestural input.

Figure 9:
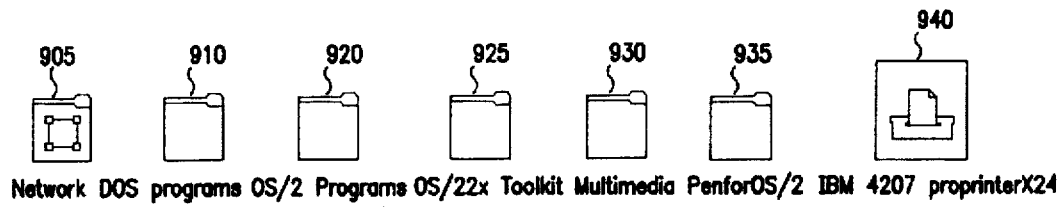
FIG. 9 depicts and OS/2 command window with an edit pad superimposed.
Figure 9:
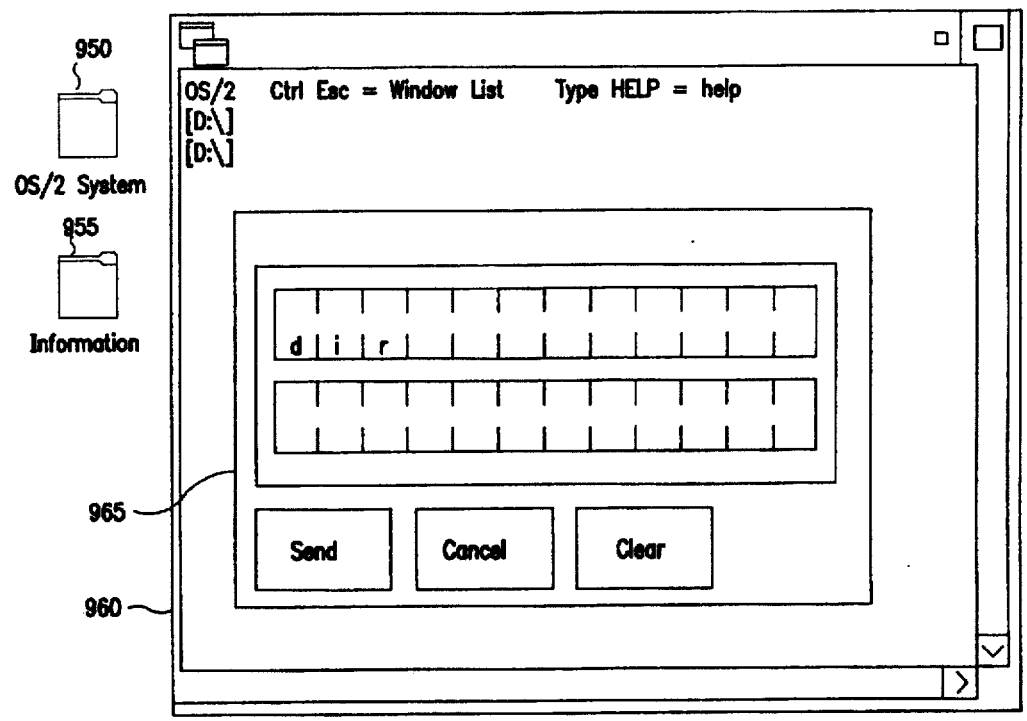
Figure 9:
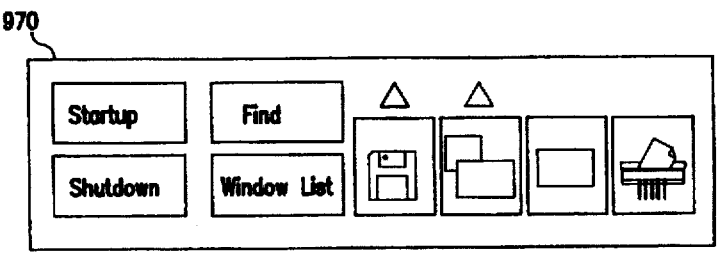

FIG. 9 depicts the edit pad with the text "dir" displayed in the combed boxes. The dialog provides the user with three3 push buttons, send, cancel and clear, with which the user may send the text to the target window, dismiss the dialog box without sending the text, or clear the text respectively. Note that when the send button is selected, the edit pad dialog does not actually send the text to the window, but rather returns to the subclass procedure with the modified text string. It is the responsibility of the calling procedure to handle the text after it has been processed by the edit pad dialog.

In FIG. 6, when the edit pad dialog completes and returns to the subclass procedure, the subclass is immediately removed at 620 and the return code is examined. If an error occurred at 625, the text is discarded at 640 and the procedure returns at 655. If the length of the returned text is zero at 630, an indication the user may have pressed the clear button, the procedure returns at 655 without taking any action. If the user cancelled the dialog by pressing the cancel button at 635, the text is discarded and the procedure returns at 655. Otherwise, the modified text string is routed to the target application window at 650 and the procedure returns at 655.

FIG. 7 depicts the concept of presentation manager subclassing. Subclassing is a common technique with any type of computer operating system that employs a graphical user interface in a windowing system. At the top message router 700 is a component of the presentation manager and the responsibility of the message router 700 is to dequeue the next message and send it to the appropriate window. It is an infinite loop, that dequeues messages and routes them appropriately. Procedure 705 is a typical window application procedure. Window procedures 705 take the next message sent to it, process the message and then return back to the message router to ask for the next message. The concept of subclassing is the need to intercept or process the message before it is seen by the application window procedure 720. In the bottom example of FIG. 7, the message router 710 dequeues the message and then calls the window procedure. However in this case the window procedure has been subclassed by a subclass window procedure 715. This subclass window procedure 715 sees the message, processes it, and then after processing it calls the original window procedure 720. Original window procedure 720 processes the message as normal and returns back to the subclass window procedure 715 and the subclass window procedure then returns back to the message router 710. The fact that there is a window subclass procedure 715 inserted in between the message router 710 and the application window procedure 720 is unknown to the application window procedure. (It is totally transparent.)

Figure 8:
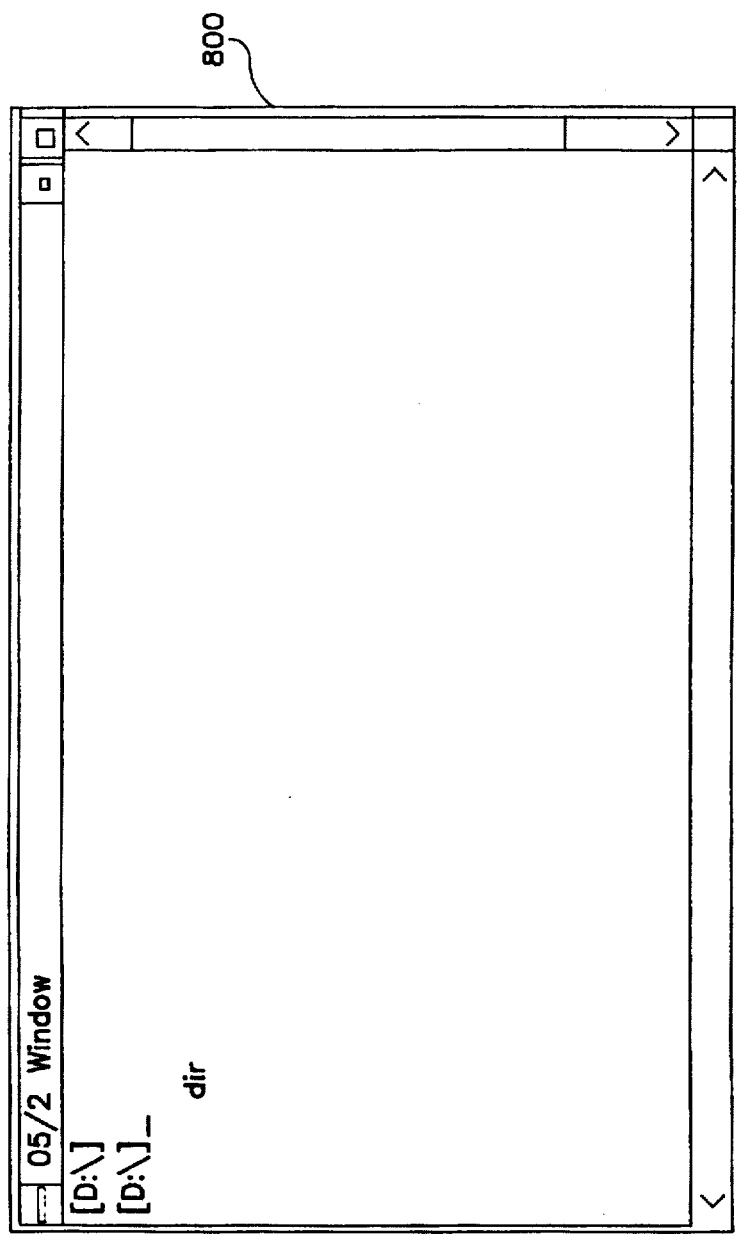
FIG. 8 depicts an OS/2 command window with handwritten text.

Reference can be made to FIG. 8, which shows a OS/2 command window 800 with handwritten text spelling the word "dir", which has been input by a pen device.

Reference to FIG. 9 shows the OS/2 command window 960 with an edit pad 965 superimposed. Note the word "dir" is shown in coded text characters in the edit pad window 965. Also shown in the figure are various icons 905 through 955 which are used in the OS/2 environment. A series of action buttons 970 are also shown displayed in FIG. 9.

Figure 9A:
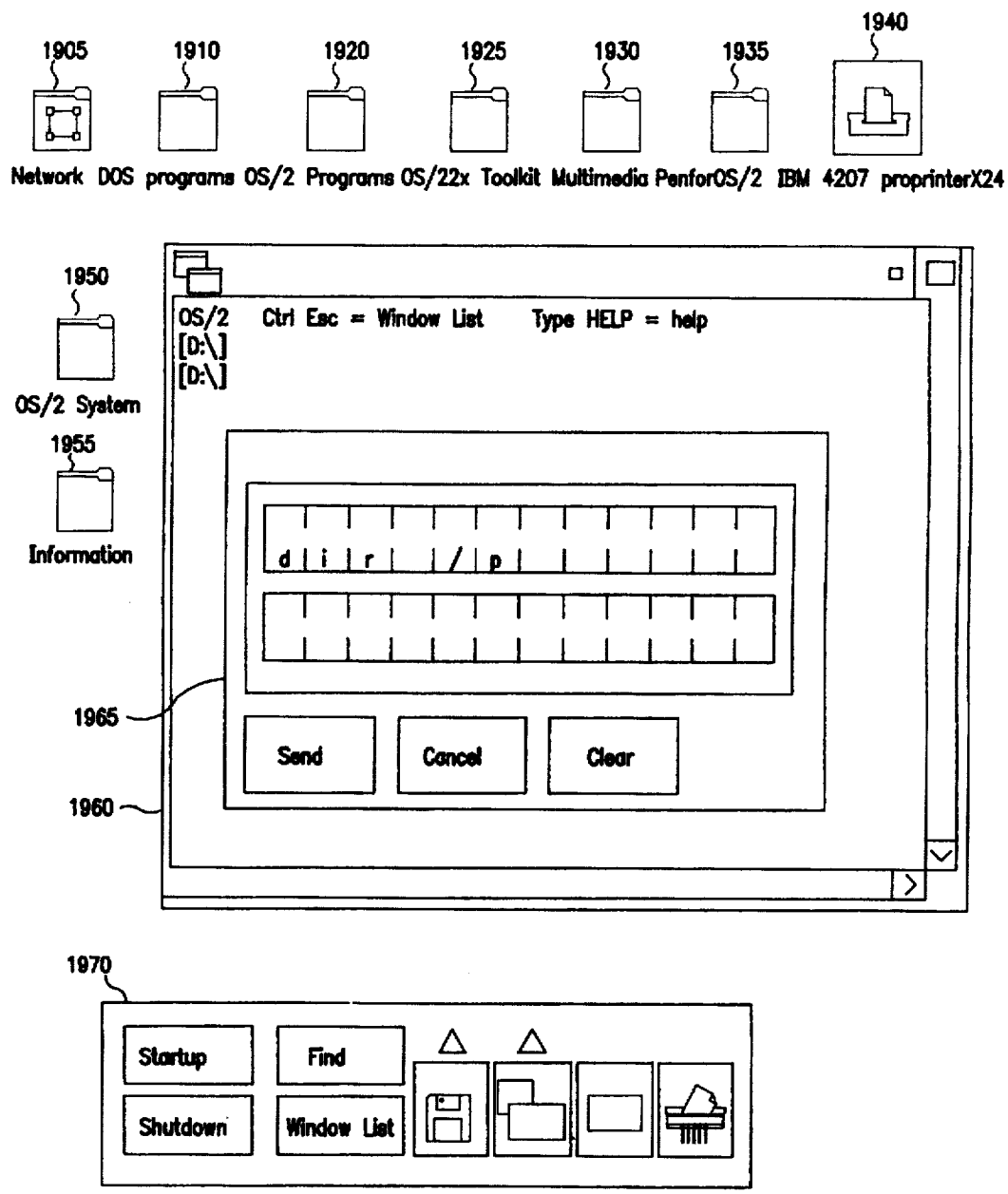
FIG. 9A depicts an OS/2 command window with an edit pad superimposed with additional handwriting annotation.

FIG. 9A shows an OS/2 command window 1960 with an edit pad 1965 superimposed with additional handwriting annotation "/p", shown as "dir/p". Also shown in FIG. 9A are icons 1905 through 1955 which are used in the OS/2 environment. Also shown in FIG. 9A is the display of action keys 1970.

Figure 10:
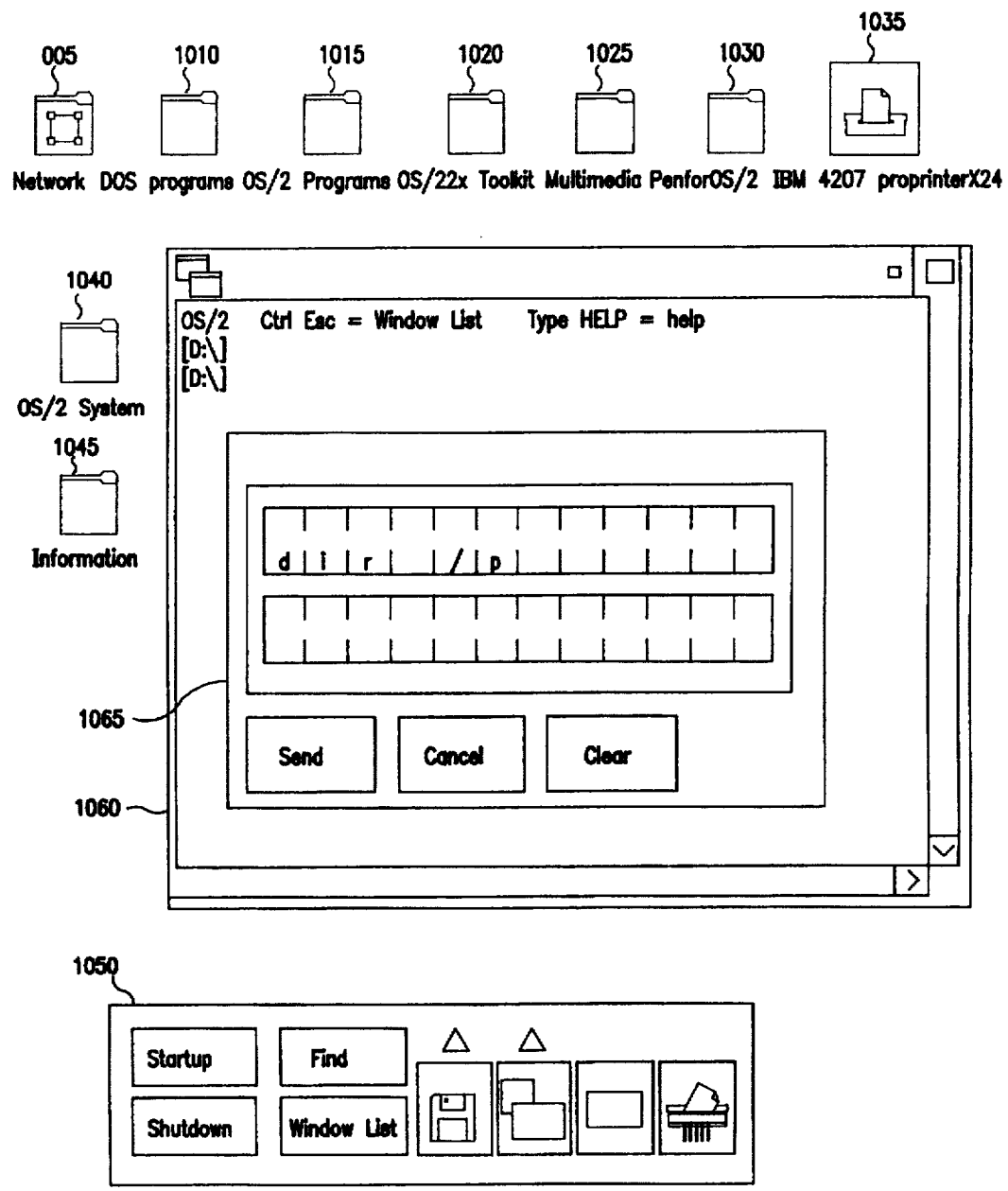
FIG. 10 depicts the edit pad with fonted text after handwriting recognition.

FIG. 10 shows the edit pad 1065 in the OS/2 window 1060, with coded (fonted) text "dir /p", which is displayed after handwriting recognition of the corresponding input in FIG. 9A. FIG. 10 also shows the icons 1005 through 1045 which are used in the OS/2 environment. FIG. 10 also shows the action buttons 1050 displayed.

Figure 11:
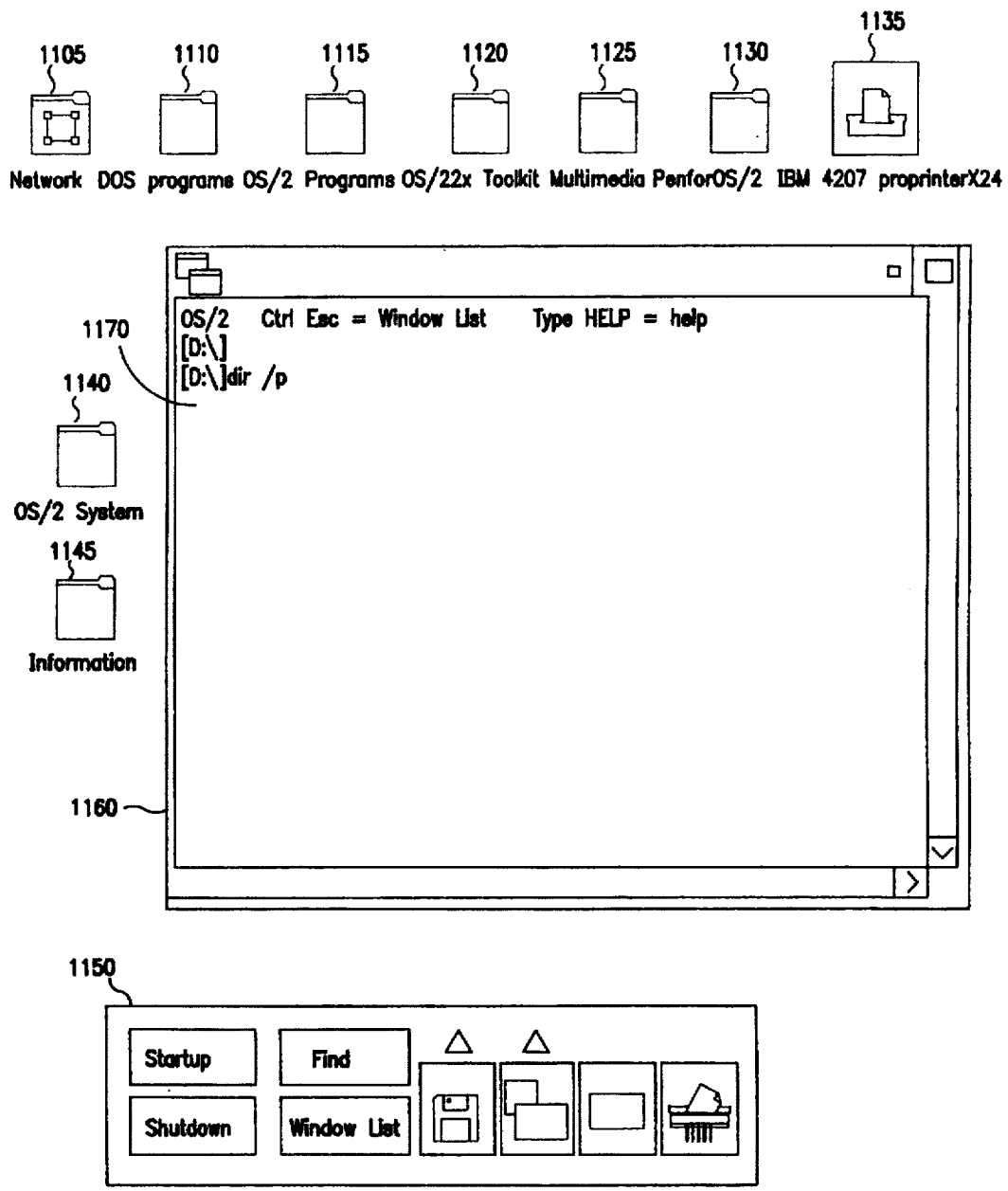
FIG. 11 depicts an OS/2 command window after receiving text from the edit pad.

FIG. 11 shows an OS/2 command window 1160 after receiving text 1170 which is "dir /p", from the edit pad shown in FIG. 10. FIG. 11 also shows the icons 1105 through 1145 which are used in the OS/2 environment. FIG. 11 also shows the action buttons 1150 which are displayed.

Figure 12:
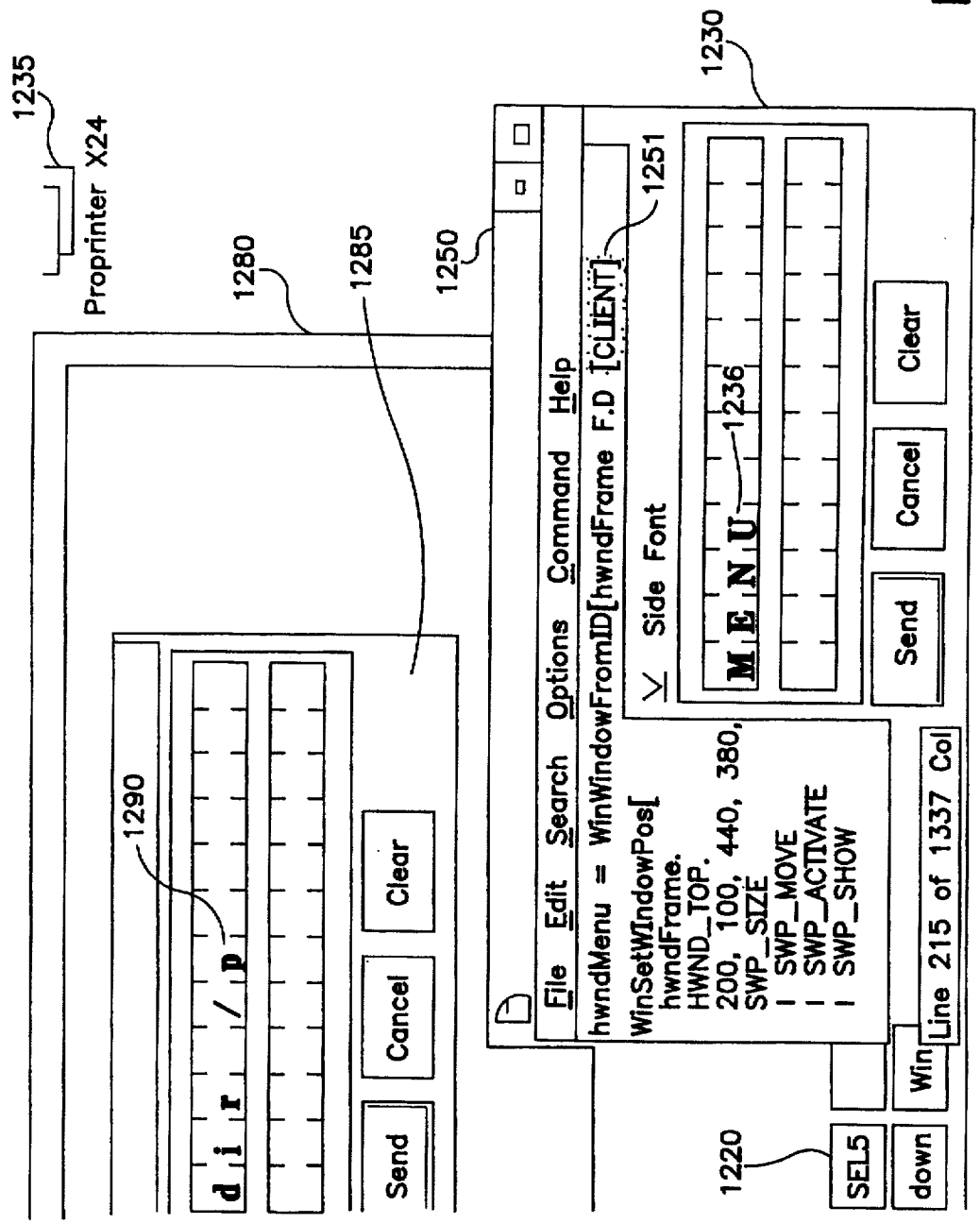
FIG. 12 depicts multiple windows with active edit pads.

FIG. 12 shows multiple windows 1280 and 1250, for example, with active edit pads 1285 and 1230, respectively. Also shown in FIG. 12 is a first string 1290 which is "dir /p" in the edit pad 1285, and a second string 1236 which is "MENU" which is shown in the edit pad 1230. Also shown in FIG. 12 is an icon 1235 and action keys 1220 which are used in the OS/2 environment.

Figure 13:
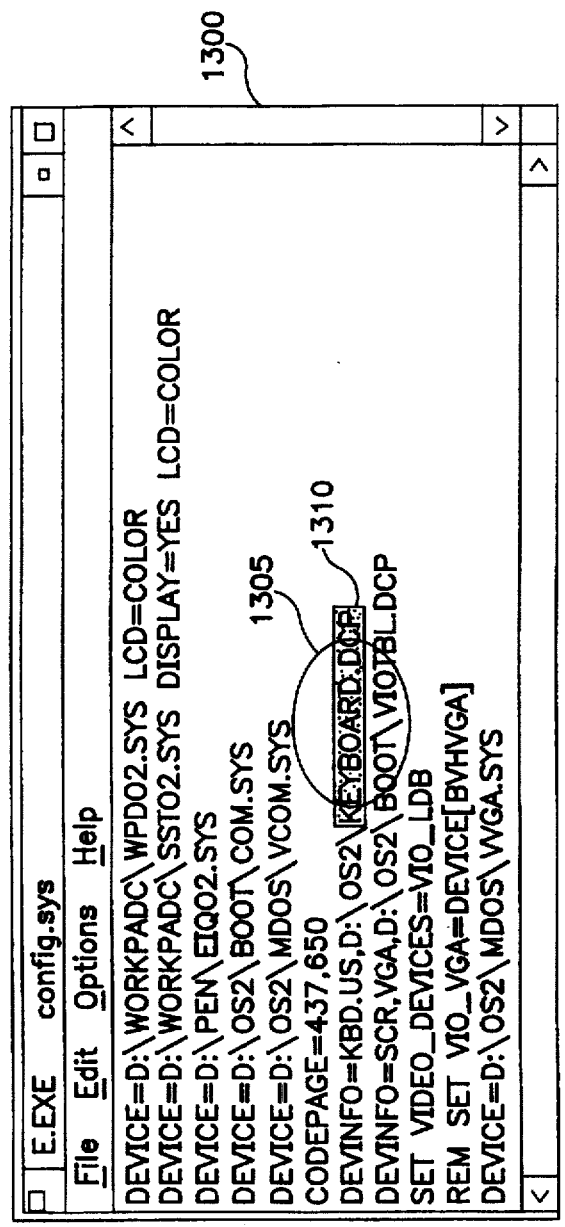
FIG. 13 depicts an editor application with highlighted text and a hand-drawn circle gestures used to pop up an edit pad.

FIG. 13 shows an editor application 1300 with highlighted text 1310 and a hand-drawn circle gesture 1305 used to pop up an edit pad.

Figure 14:
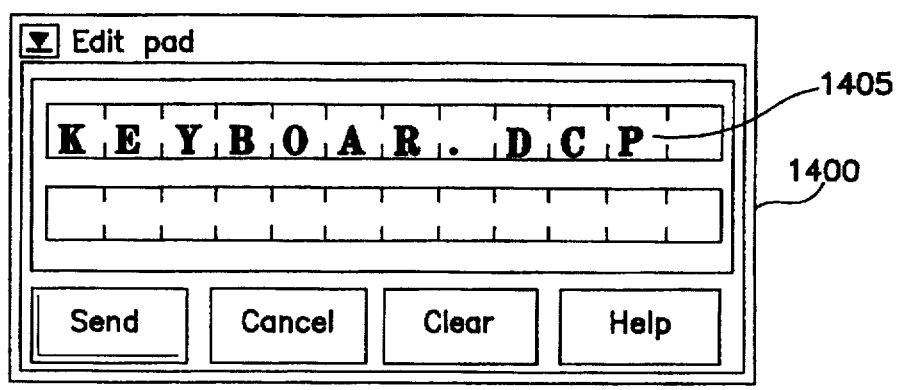
FIG. 14 depicts an edit pad displaying the previously highlighted text.

FIG. 14 shows the edit pad 1400 displaying the previously highlighted text 1310 in FIG. 13, as the text string 1405 in FIG. 14, which is "KEYBOAR.DCP".

Figure 15:
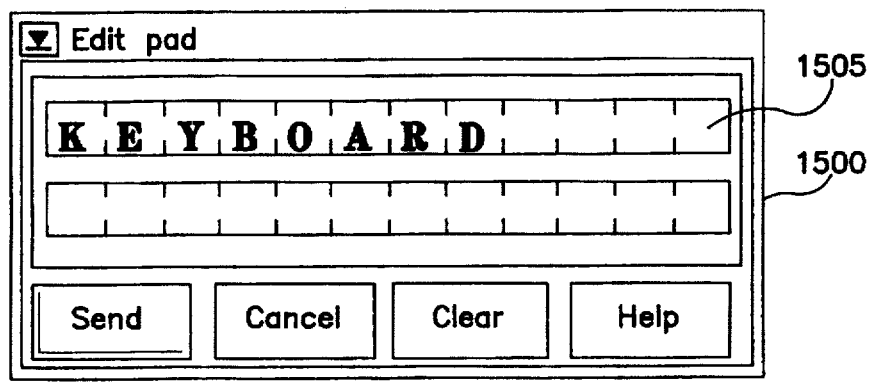
FIG. 15 depicts an edit pad with a hand-drawn scratch-out gesture over the last 4 characters.

FIG. 15 shows an edit pad 1500 with a hand-drawn scratch gesture 1505 over the last four characters ".DCP", which originally appeared as a part of the character string 1405 in FIG. 14.

Figure 16:
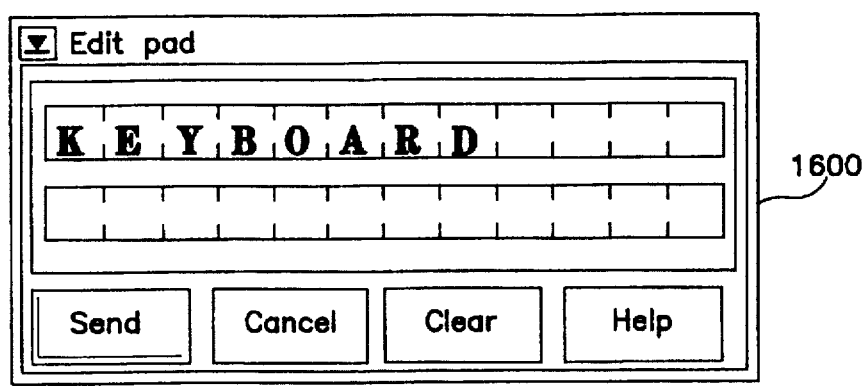
FIG. 16 depicts the edit pad after the scratch-out gesture command is completed.

FIG. 16 shows the edit pad 1600 after the scratch out gesture command 1505 of FIG. 15 has completed execution. It is seen that the remaining character string "KEYBOARD" shown in FIG. 16 is displayed without the scratched-out portion ".DCP", which was removed in FIG. 15.

Thus it is seen that the invention provides for the display of an edit pad on behalf of pen-unaware applications for the purposes of providing the user with a correction dialog.

Normally a pen aware application that is specifically written to accept pen input would provide functionality to facilitate pen input and correction from a user.

The problem solved by the invention is that an unaware application does not have any of this ability. The invention provides this ability for an unaware application, if the user so desires, every time the user writes to a window of an unaware application. In FIG. 8 for example, the user wrote "dir", to do a directory. The invention automatically performs recognition on the handwriting and after recognition the edit window popped up as in FIG. 9 displaying the text. At this point the user can modify or add to it and then send it to the window by hitting the send button. FIG. 9A shows the "DIR" command and adding a "/p" that will cause the display of only one window's worth of information at a time. FIG. 10 shows the results of the handwriting entered into FIG. 9A, the "/p" comes back recognized as a "/p" and FIG.

11 shows the results of hitting the send button. The "dir /p" is actually sent into the window at which point the user would enter another gesture in the window which would force the operating system to execute the command.

The resulting invetion provides functionality that a pen aware application would normally provide, to unaware applications. Unaware applicatiaons are any current string processing applications, specifically any applications that process text, such as a word processor. The invention intercepts recognized handwritten characters to unaware applications and displays them for user confirmation and/or correction. Applications that are not word processors have input fields that read text input and this invention can be used for any field or any window in an application that requires text input. Another feature of the invention includes that once the window pops up after a certain amount of time, the invention automatically dismisses the window and assumes that if the user has not begun any kind of correction scenario he has no intention of doing so. The system is reaccessing the user's hitting the send button and the text is automatically sent to the window. If the system sees the user motioning with the pen over the window, the system would not dismiss it. It would wait for the user to perform some kind of correction.

Although a specific embodiment of the invention has been disclosed, it will be understood by those having skill in the art that changes can be made to that specific embodiment without departing from the spirit and the scope of the invention.

What is claimed is:

1. In a data processing system running at least a first and a second multitasked application programs, a method for correcting hand-printed character input represented as a sequence of points described by a writing path of a pointing device, comprising the steps of:

sensing with the first application program the proximity of a pointing device to a display surface in the data processing system to make an input to the first application program;

receiving with the first application program a writing path signal from said pointing device in the data processing system, describing a first hand printed character input;

performing with the first application program character recognition on said writing path signal to provide a first character string to the first application program in the data processing system;

running a first edit pad program in response to performing said character recognition step;

displaying with the first edit pad program said first character string in an edit pad area formed by said first edit pad program in the data processing system;

sensing with the second application program the proximity of a pointing device to a display surface in the data processing system to make an input to the second application program;

receiving with the second application program a second writing path signal from said pointing device in the data processing system, describing a second hand printed character input;

performing with the second application program a second character recognition on said second writing path signal to provide a second character string to the second application program in the data processing system;

running a second edit pad program in response to performing said second character recognition step;

displaying with the second edit pad program said second character string in a second edit pad area formed by said second edit pad program in the data processing system;

selectively removing with the second edit pad program said second edit pad area from display if no proximity of the pointing device is sensed within a predetermined time interval;

selectively extending with the second edit pad program the duration of display of said second edit pad area if proximity of the pointing device is sensed within said predetermined time interval;

receiving with the first edit pad program a correcting writing path signal in said first edit pad area from said pointing device in the data processing system, describing a correction to said first hand printed character input;

performing with the first edit pad program character recognition on said correcting writing path signal to provide a third character string in the data processing system; and transferring with the first edit pad program said third character string to a character input of said first application program running in the data processing system.

2. The method of claim 1, which further comprises the steps of:

storing said third character string in an archiving buffer in the data processing system;

selectively displaying said third character string from said archiving buffer in said first edit pad area;

receiving a second correcting writing path signal in said first edit pad area from a pointing device in the data processing system, describing a second correction to said first hand printed character input;

performing character recognition on said second correcting writing path signal to provide a fourth character string in the data processing system; and transferring said fourth character string to a character input of said first application program running in the data processing system.

3. In a data processing system, a method for correcting hand printed character input represented as a sequence of points described by a writing path of a pointing device, comprising the steps of:

running a first application program in a multi-tasking mode in a data processing system;

sensing the proximity of a pointing device to a display surface in the data processing system:

receiving a first writing path signal from said pointing device in the data processing system, describing a first hand printed character input;

performing character recognition on said first writing path signal to provide a first character string in the data processing system;

displaying said first character string in a first edit pad area associated with said first application program in the data processing system;

selectively removing said edit pad area from display if no proximity of the pointing device is sensed within a predetermined time interval;

selectively extending the duration of display of said edit pad area if proximity of the pointing device is sensed within said predetermined time interval:

receiving a first correcting writing path signal in said first edit pad area from a pointing device in the data processing system, describing a correction to said first hand printed character input;

performing character recognition on said first correcting writing path signal to provide a second character string in the data processing system;

transferring said second character string to a character input of said first application program;

running a second application program in a multi-tasking mode in a data processing system;

receiving a second writing path signal from a pointing device in the data processing system, describing a second hand printed character input;

performing character recognition on said second writing path signal to provide a third character string in the data processing system;

displaying said third character string in a second edit pad area associated with said second application program in the data processing system;

receiving a second correcting writing path signal in said second edit pad area from a pointing device in the data processing system, describing a correction to said second hand printed character input;

performing character recognition on said second correcting writing path signal to provide a fourth character string in the data processing system; and transferring said fourth character string to a character input of said second application program.

4. The method of claim 3, which further comprises the steps of:

storing said second character string in a first archiving buffer in the data processing system;

selectively displaying said second character string from said archiving buffer in said first edit pad area;

receiving a repeat correcting writing path signal in said first edit pad area from a pointing device in the data processing system, describing a repeat correction to said first hand printed character input;

performing character recognition on said repeat correcting writing path signal to provide a repeat character string in the data processing system; and transferring said repeat character string to a character input of said first application program running in the data processing system.

5. In a data processing system, a method for correcting hand-printed character input represented as a sequence of points described by a writing path of a pointing device, comprising the steps of:

receiving a writing path signal from a pointing device for an application program in the data processing system, describing a first hand printed character input;

determining that said application program in said data processing system is not a pen-aware application;

performing character recognition on said writing path signal to provide a first character string in the data processing system;

displaying said first character string with an edit pad program in an edit pad area in the data processing system in response to said character recognition step;

receiving a correcting writing path signal with said edit pad program in said edit pad area from a pointing device in the data processing system, describing a correction to said first hand printed character input;

performing character recognition on said correcting writing path signal to provide a second character string in the data processing system;

transferring said second character string to a character input of said application program running in the data processing system.

6. In a data processing system, a method for correcting hand-printed character input represented as a sequence of points described by a writing path of a pointing device, comprising the steps of:

receiving a writing path signal from a pointing device in the data processing system;

displaying with an edit pad program an edit pad area in said data processing system in response to said receiving step;

waiting a predetermined time interval for additional writing path signal;

removing said edit pad area from display if no additional writing path signal is received;

receiving an additional writing path signal from said pointing device describing a first hand printed character input;

determining that an application program in said data processing system is not a pen-aware application;

performing character recognition on said additional writing path signal to provide a first character string in the data processing system;

displaying with an edit pad program said first character string in said edit pad area in the data processing system in response to said recognition step;

receiving a correcting writing path signal in said edit pad area from a pointing device in the data processing system, describing a correction to said first hand printed character input;

performing character recognition on said correcting writing path signal to provide a second character string in the data processing system;

transferring said second character string to a character input of said application program running in the data processing system.

7. In a data processing system running at least a first and a second multitasked application programs, apparatus for correcting hand-printed character input represented as a sequence of points described by a writing path of a pointing device, comprising:

means for sensing with the first application program the proximity of a pointing device to a display surface in the data processing system to make an input to the first application program;

means for receiving with the first application program a writing path signal from said pointing device in the data processing system, describing a first hand printed character input;

means for performing with the first application program character recognition on said writing path signal to provide a first character string to the first application program in the data processing system;

means for running a first edit pad program in response to performing said character recognition;

means for displaying with the first edit pad program said first character string in an edit pad area formed by said first edit pad program in the data processing system;

means for sensing with the second application program the proximity of a pointing device to a display surface in the data processing system to make an input to the second application program;

means for receiving with the second application program a second writing path signal from said pointing device in the data processing system, describing a second hand printed character input;

means for performing with the second application program a second character recognition on said second writing path signal to provide a second character string to the second application program in the data processing system;

means for running a second edit pad program in response to performing said second character recognition;

means for displaying with the second edit pad program said second character string in a second edit pad area formed by said second edit pad program in the data processing system;

means for selectively removing with the second edit pad program said second edit pad area from display if no proximity of the pointing device is sensed within a predetermined time interval;

means for selectively extending with the second edit pad program the duration of display of said second edit pad area if proximity of the pointing device is sensed within said predetermined time interval;

means for receiving with the first edit pad program a correcting writing path signal in said first edit pad area from said pointing device in the data processing system, describing a correction to said first hand printed character input;

means for performing with the first edit pad program character recognition on said correcting writing path signal to provide a third character string in the data processing system; and means for transferring with the first edit pad program said third character string to a character input of said first application program running in the data processing system.

* * * * *